US012729974B2

(12) United States Patent
Agrawal et al.

(10) Patent No.: US 12,729,974 B2
(45) Date of Patent: Sep. 8, 2026

(54) AUGMENTED REALITY PROJECTION OF PREDICTED VEHICLE MOVEMENTS

(71) Applicant: INTERNATIONAL BUSINESS MACHINES CORPORATION, Armonk, NY (US)

(72) Inventors: Tushar Agrawal, West Fargo, ND (US); Sarbajit K. Rakshit, Kolkata (IN); Jennifer M. Hatfield, San Francisco, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 314 days.

(21) Appl. No.: 18/057,733

(22) Filed: Nov. 21, 2022

(65) Prior Publication Data

US 2024/0167836 A1 May 23, 2024

(51) Int. Cl.
*G01C 21/36* (2006.01)

(52) U.S. Cl.
CPC ....... *G01C 21/3635* (2013.01); *G01C 21/367* (2013.01); *G01C 21/3676* (2013.01)

(58) Field of Classification Search
CPC ............ G01C 21/3626; G01C 21/3635; G01C 21/3641; G01C 21/365; G01C 21/367; G01C 21/3676; G08G 1/0968; G08G 1/097
See application file for complete search history.

(56) References Cited

U.S. PATENT DOCUMENTS

| | | | | |
|---|---|---|---|---|
| 7,317,406 | B2 | 1/2008 | Wolterman | |
| 10,360,714 | B1 | 7/2019 | Xue | |
| 10,410,523 | B1 | 9/2019 | Bostick | |
| 2016/0371300 | A1* | 12/2016 | Yamada | G08G 1/096716 |
| 2017/0219373 | A1* | 8/2017 | DiMeo | G06Q 30/0283 |
| 2017/0220863 | A1 | 8/2017 | Lection | |
| 2017/0284816 | A1* | 10/2017 | Greenspan | G01C 21/3492 |
| 2017/0337813 | A1* | 11/2017 | Taylor | G05D 1/0285 |
| 2018/0032875 | A1 | 2/2018 | Bostick | |

(Continued)

FOREIGN PATENT DOCUMENTS

WO WO2017091877 * 6/2017 ............ H04W 4/029

OTHER PUBLICATIONS

Hussein, P2V and V2P communication for Pedestrian warning on the basis of Autonomous Vehicles—2016 (Year: 2016).*

(Continued)

*Primary Examiner* — Phuc N Doan
(74) *Attorney, Agent, or Firm* — Steven M. Bouknight

(57) ABSTRACT

A computer-implemented method, a computer system and a computer program product predict and project vehicle movements in an augmented reality (AR) environment. The method includes obtaining telemetry data from a vehicle in an environment, where the telemetry data is selected from a group consisting of: video data, audio data and text data. The method also includes determining a path for the vehicle based on the telemetry data. The method further includes identifying an augmented reality device in the path, where the augmented reality device is associated with a user proximate to the path. Lastly, the method includes displaying the path using the augmented reality device in the augmented reality (AR) environment.

20 Claims, 2 Drawing Sheets

(56) References Cited

U.S. PATENT DOCUMENTS

| | | | | |
|---|---|---|---|---|
| 2020/0005643 | A1* | 1/2020 | Park | G08G 1/161 |
| 2020/0302780 | A1* | 9/2020 | Awai | B60W 60/0016 |
| 2020/0324787 | A1* | 10/2020 | Wang | B60W 50/14 |
| 2021/0207971 | A1* | 7/2021 | Kim | G06V 20/58 |
| 2022/0051184 | A1* | 2/2022 | Cella | G06N 3/04 |
| 2022/0188545 | A1 | 6/2022 | Nagar | |
| 2023/0258466 | A1* | 8/2023 | Lee | G01C 21/3476 701/426 |
| 2024/0210186 | A1* | 6/2024 | Akashi | B66F 9/0755 |

OTHER PUBLICATIONS

Hesenius, Don't Panic! Guiding Pedestrians in Autonomous Traffic with Augmented Reality—2018 (Year: 2018).*
Saenz, Detecting phone-related pedestrian distracted behaviours via a two-branch convolutional neural network (Year: 2020).*
Chu, "Algorithm tells robots where nearby humans are headed," MIT News Office, https://news.mit.edu/2019/robots-predict-human-movement-0611, Publication Date: Jun. 10, 2019, pp. 1-4.
Disclosed Anonymously, "Emergency Vehicle Path Projection Using Augmented Reality," https://ip.com/IPCOM/000256444, IP.com No. IPCOM000256444D, IP.com Electronic Publication Date: Nov. 30, 2018, pp. 1-3.
Disclosed Anonymously, "Vehicle Path Intent Sharing Via Optical Overlay Visualization with Data Infusion," https://ip.com/IPCOM/000261602, IP.com No. IPCOM000261602D, IP.com Electronic Publication Date: Mar. 20, 2020, pp. 1-5.
IBM, "Environment, health and safety (EHS) solutions", https://www.ibm.com/business-operations/environmental-health-safety, Accessed Jul. 11, 2022, pp. 1-10.
Izquierdo et al., "Vehicle Lane Change Prediction on Highways Using Efficient Environment Representation and Deep Learning", https://ieeexplore.ieee.org/document/9520420, IEEE Access, vol. 9, Sep. 3, 2021, pp. 119454-119465.
Venturebeat, "Applying machine learning to keep employees safe and save lives", https://venturebeat.com/2020/09/29/applying-machine-learning-to-keep-employees-safe-and-save-lives/, Sep. 29, 2020, pp. 1-9.
No Author, "Work safe and work smart with workplace safety solutions that provide real-time insights", https://web.archive.org/web/20200922145500/https://www.IBM.com/business-operations/enterprise-asset-management/worker-workplace-safety-solutions, Sep. 22, 2020, 9 pages.

* cited by examiner

COMPUTER 101

PROCESSOR SET 110

PROCESSING CIRCUITRY 120

CACHE 121

COMMUNICATION FABRIC 111

VOLATILE MEMORY 112

PERSISTENT STORAGE 113

OPERATING SYSTEM 122

MOVEMENT PROJECTION MODULE 150

PERIPHERAL DEVICE SET 114

UI DEVICE SET 123

STORAGE 124

IoT SENSOR SET 125

NETWORK MODULE 115

END USER DEVICE 103

WAN 102

REMOTE SERVER 104

REMOTE DATABASE 130

PRVATE CLOUD 106

GATEWAY 140

PUBLIC CLOUD 105

CLOUD ORCHESTRATION MODULE 141

HOT PHYSICAL MACHINE SET 142

VIRTUAL MACHINE SET 143

CONTAINER SET 144

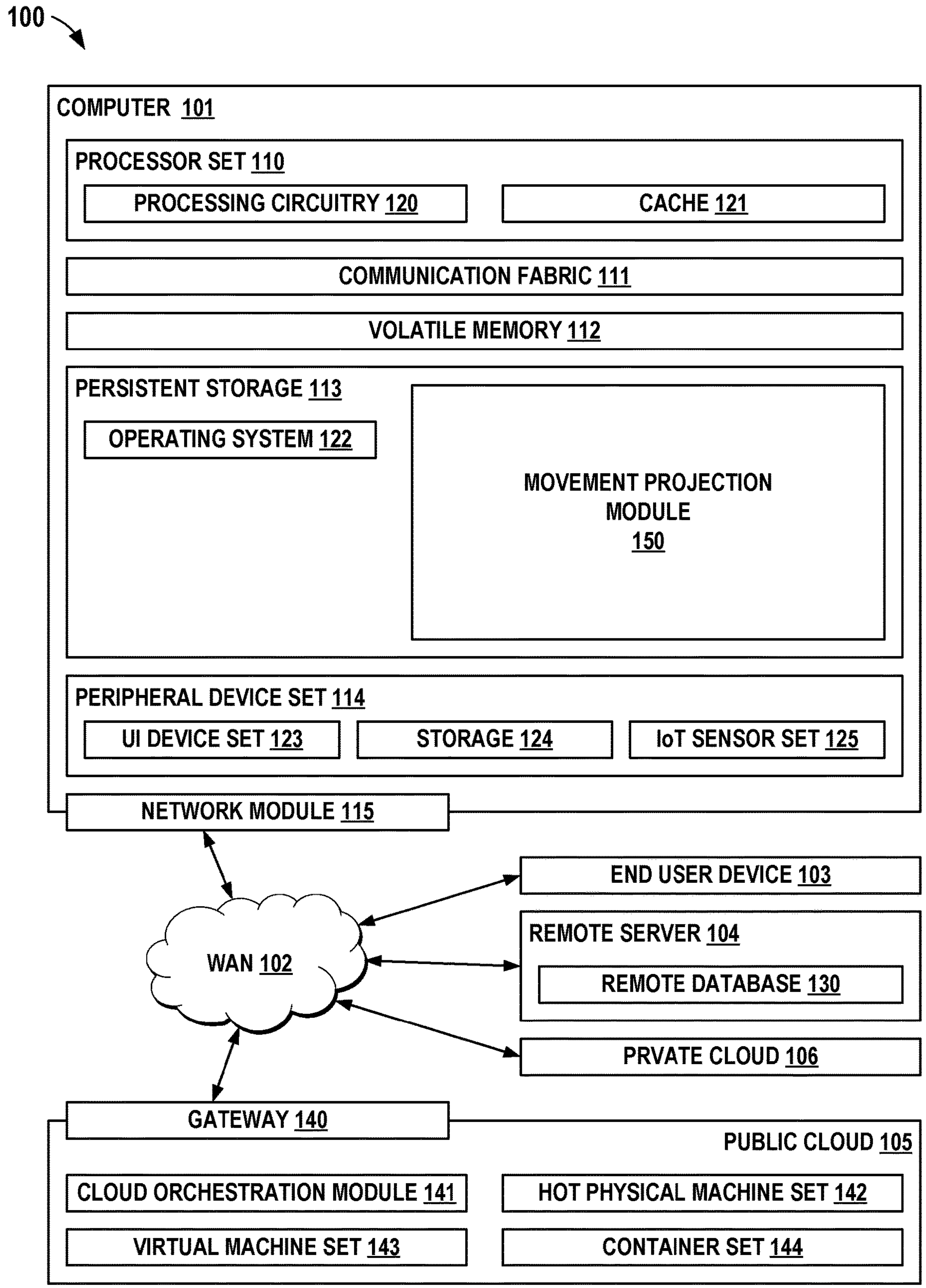

FIG. 1

AUGMENTED REALITY PROJECTION OF PREDICTED VEHICLE MOVEMENTS

BACKGROUND

Embodiments relate generally to projecting images within a virtual or augmented reality environment, and more specifically to displaying predicted movements of an autonomous or semi-autonomous vehicle in a user's view of the augmented reality environment.

Augmented reality (AR) technology may provide a real-time view of a physical, real-world environment with objects that may be augmented with computer-generated virtual elements, e.g., sound, video, graphics and/or positioning data. For example, mobile computing devices may provide augmented reality applications that allow users to see an augmented view of a surrounding real-world environment through a camera of the mobile computing device, where an application may overlay the camera view of the surrounding environment with data, such as telemetry information about vehicles in the proximate area of a user. In addition to mobile computing devices, a user may wear a headset or other apparatus that may be used to view the enhanced environment.

SUMMARY

An embodiment is directed to a computer-implemented method for predicting and projecting vehicle movements in an augmented reality (AR) environment. The method may include obtaining telemetry data from a vehicle in an environment, where the telemetry data is selected from a group consisting of: video data, audio data and text data. The method may also include determining a path for the vehicle based on the telemetry data. The method may further include identifying an augmented reality device in the path, where the augmented reality device is associated with a user proximate to the path. Lastly, the method may include displaying the path using the augmented reality device in the augmented reality (AR) environment.

In another embodiment, the method may include transmitting an alert to the user.

In a further embodiment, the determining the path for the vehicle may include creating a digital twin instance of the vehicle. In this embodiment, the determining the path for the vehicle may further include generating a simulation of the movements of the vehicle using the digital twin instance and updating the path based on the simulation of the movements of the vehicle.

In yet another embodiment, the method may include displaying the simulation of the movements of the vehicle on the augmented reality device.

In another embodiment, the identifying the augmented reality device may include obtaining user data from the environment, where the user data is selected from a second group consisting of: user image data, user audio data and user text data and determining that a user is proximate to the path of the vehicle, where the user is associated with the augmented reality device.

In a further embodiment, the method may include receiving a request from the user for a vehicle path in the environment and displaying the path to the user in the augmented reality environment.

In yet another embodiment, the determining the path of the vehicle uses a machine learning model that predicts a position of a moving vehicle based on movement data and historical information about the moving vehicle.

In addition to a computer-implemented method, additional embodiments are directed to a computer system and a computer program product for predicting and projecting vehicle movements in an augmented reality (AR) environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 depicts a block diagram of an example computer system in which various embodiments may be implemented.

DETAILED DESCRIPTION

Figure 2:
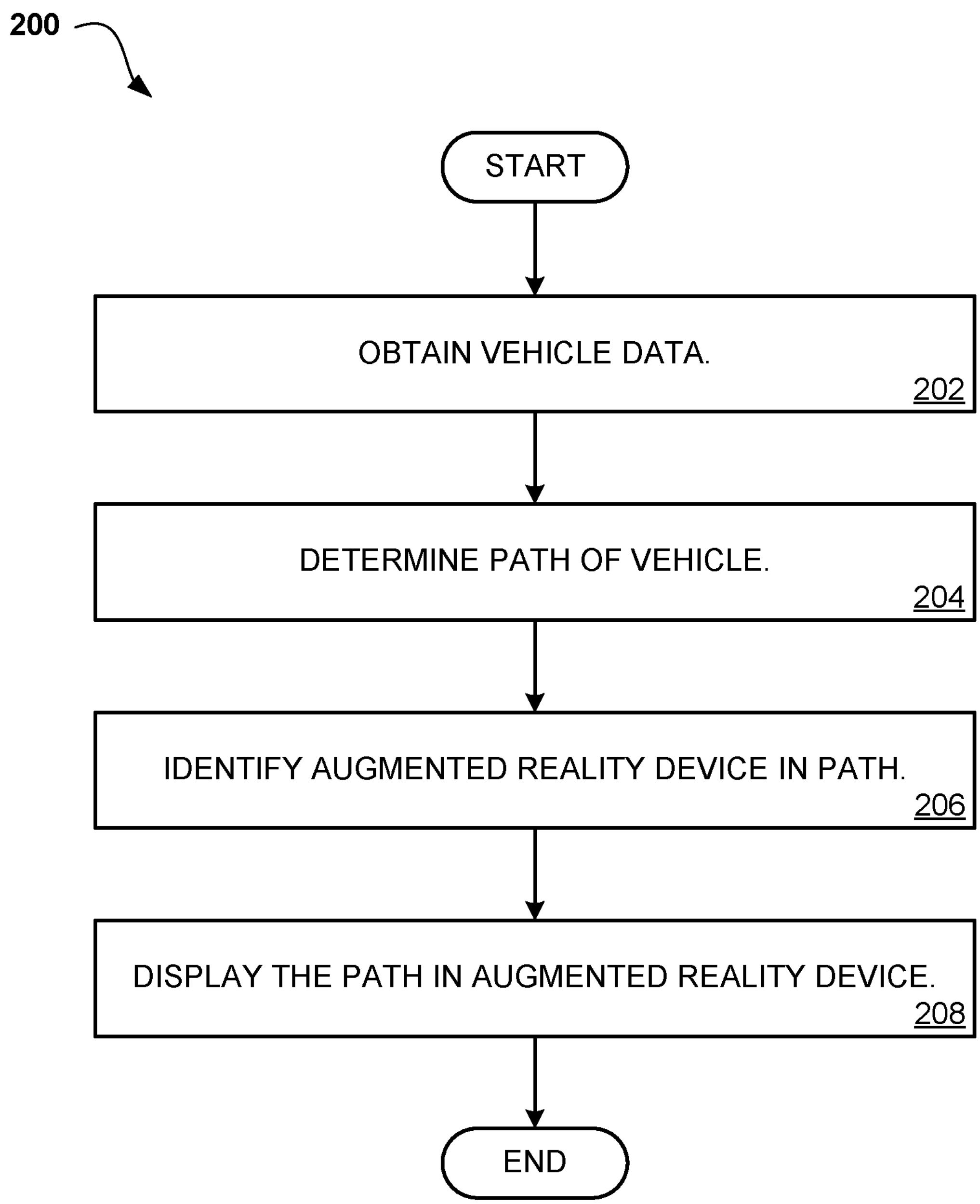
FIG. 2 depicts a flow chart diagram for a process that predicts vehicle movements for display in an augmented reality (AR) environment according to an embodiment.

In today's commercial ecosystem, autonomous and semi-autonomous vehicles may be prevalent, such as robotic transports in warehouses and manufacturing facilities, and may have sufficient "awareness" of the surrounding environment to avoid obstacles, such as human bystanders or debris in a vehicle's path. For many such vehicles, however, due to size and a lack of agility, there may be a limited ability to completely avoid obstacles, especially suddenly appearing obstacles. This limit may be highly acute for large semi-autonomous vehicles, e.g., trains or airplanes taxiing in an airport, which may have very limited ability to stop or maneuver quickly should something appear in their path. In addition, even should the vehicle be able to stop or maneuver around an obstacle, such movement may interfere with a schedule and cause ripple effects on costs and production schedules. To alleviate this issue, many vehicles employ emergency warning devices, such as sirens, horns, or flashing lights, to warn people in the immediate area of their approach and presence. However, such warning devices are not always heard or seen, such as from the deaf and blind, or from persons wearing ear coverings on a manufacturing floor. What is needed in addition to audio and visual warning devices is a more personalized approach to perimeter warning that may be focused on exactly those users in the path of the vehicle.

It may therefore be useful to provide a system or method that includes the capability to predict the path of a vehicle and also be able to project a vehicle's predicted movements to a user that may be affected by those movements. Such a system or method may leverage the capability of a semi-autonomous or autonomous vehicle to both collect and provide telemetry data about a vehicle's movements, such that predictions may be made about a future path or any movement of a vehicle using techniques such as and including digital twin simulations. At the same time, an augmented reality (AR) interface with a headset, also known as AR "glass," may be provided to a user, which may offer a real-time view of a physical, real-world environment whose elements are "augmented" by computer-generated sensory input such as sound, video, graphics and positioning data. A display of the surrounding area near a user may be enhanced by augmented data pertinent to the surrounding area using an augmented reality device. An augmented reality application may use images in the surrounding environment from a camera, which may also determine the user's position based on global positioning satellite (GPS) data, triangulation of the device's location, or other positioning methods. The application may then overlay the camera view of the surrounding environment with information, e.g., telemetry data of vehicles in the area. Virtual reality environments may be rendered and exposed to users in much the same way, except that instead of displaying the surrounding area as the background, an entirely artificial environment may be rendered by a virtual reality application with similar enhancements made to the objects in the field of view.

The system or method may use the telemetry data that may be available to a vehicle to determine a current position of a vehicle and a predicted path for the vehicle based on techniques such as a digital twin simulation of the vehicle, then project the path as a holographic image in an augmented reality environment that may be present on a device in the possession of a user in the environment.

Referring to FIG. 1, computing environment 100 contains an example of an environment for the execution of at least some of the computer code involved in performing the inventive methods, such as movement projection module 150. In addition to movement projection module 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in movement projection module 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of VCEs will now be provided. VCEs can be stored as “images.” A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Computer environment 100 may be used to predict and project vehicle movements in an augmented reality (AR) environment. In particular, movement projection module 150 may obtain telemetry data about a vehicle in a surrounding area that may include users and use the telemetry data to predict the movements of the vehicle within the surrounding area and display the movement predictions, including a path of the vehicle, within an augmented reality (AR) projection of the surrounding area.

Referring to FIG. 2, an operational flowchart illustrating a process 200 that predicts and projects vehicle movements in an augmented reality (AR) environment is depicted according to at least one embodiment. At 202, data related to a vehicle, e.g., a semi-autonomous vehicle, fully autonomous vehicle and, in some cases, a manually driven vehicle, and the movements of the vehicle may be obtained, including video data, audio data and telemetry data. Various sensors may be deployed on the vehicle to determine a relative position of the vehicle, a direction of motion, as well as various vehicle health parameters that may assist in determining the motion of the vehicle. As an example of vehicle health, if a vehicle fuel level is low, then this may indicate that the vehicle will be removed from service or may stop suddenly. It is not required that the obtained data take a specific form, only that the process is informed of the position and movements of the vehicle such that predictions may be made about those movements.

It should be noted that all collection of information from a vehicle or other source that may personally identify a human driver or any other user or is sensitive in any other way requires the informed consent of all people whose information may be collected and analyzed for the purposes of the invention. Consent may be obtained in real time or through a prior waiver or other process that informs a subject that their information may be captured by a device or other process and that the information may be used to predict a required range for a communications network and the devices that may therefore be needed in the communications network. The information owner is free to decide at any time to revoke consent for use of sensitive information as these settings are permanently retained to keep the movement projection module 150 updated with the latest information and also allow the owner of the information complete control over their informed consent to use sensitive information in the course of the invention. The consent described here may also refer to allowing some, or any, data relating to an information owner's vehicle from being sent to a local server, cloud server or any other location. The owner has complete control on the transmission of information that may be sensitive or personally identify the owner of the information beyond the vehicle.

At 204, a path of the vehicle may be determined as an extrapolation of the existing vehicle movement data that may be obtained. In an embodiment, a digital twin simulation of the vehicle may be used in the prediction of the vehicle path. A digital twin is a virtual model designed to accurately reflect a physical object. The object being studied, e.g., a vehicle, may be outfitted with various sensors related to vital areas of functionality which produce data about different aspects of the physical object's performance, such as fuel or battery level, tire wear or air level, oil levels or other engine performance metrics, temperature, weather conditions, etc. This data may then be relayed to a processing system and applied to the digital copy. Once informed with such data, the virtual model can be used to run simulations, study performance issues and generate possible improvements, all with the goal of generating valuable insights, all of which may then be applied back to the original physical object.

Although simulations and digital twins both utilize digital models to replicate various processes, a digital twin is actually a virtual environment and while a simulation typically studies one particular process, a digital twin can itself run any number of useful simulations in order to study multiple processes. Digital twins are designed around a two-way flow of information that first occurs when object sensors provide relevant data to the system processor and then happens again when insights created by the processor are shared back with the original source object. By having better and constantly updated data related to a wide range of areas, along with the added computing power that accompanies a virtual environment, digital twins are able to study more issues from far more vantage points than standard simulations and have greater ultimate potential to improve products and processes. Examples of the types of digital twins include component twins, which are the basic unit of digital twin or the smallest example of a functioning component, parts twins, which pertain to components of slightly less importance, asset twins, which study the interaction between components that work together, system (or unit) twins, which enable you to see how different assets come together to form an entire functioning system, and process twins, which are the macro level of magnification and reveal how systems work together to create an entire production facility, which may help determine the precise timing schemes that ultimately influence overall effectiveness.

In an embodiment, a supervised machine learning model may be trained to predict the path of a vehicle based on the historical information about the vehicle and the current movement data of the vehicle. One or more of the following machine learning algorithms may be used: logistic regression, naive Bayes, support vector machines, deep neural networks, random forest, decision tree, gradient-boosted tree, multilayer perceptron. In an embodiment, an ensemble machine learning technique may be employed that uses multiple machine learning algorithms together to assure better classification when compared with the classification of a single machine learning algorithm. In this embodiment, training data for the model may include historical information about a vehicle, including dimensions and shape of a vehicle or other fixed specifications of a vehicle, but also extending to information about how a vehicle is used in a specific space. For instance, if a vehicle is in an airport and used to tow an airplane from a runway to a gate, then there may be a path to be learned by the process or other routine movements that may be learned to predict the position and path of the vehicle at certain times. The training data may be collected from a single vehicle or multiple vehicles over a longer period of time. The results may be stored in a database so that the data is most current, and the output would always be up to date. It should be noted that this embodiment may coexist with the digital twin simulation, such that the predictions of the supervised machine learning model may be used in the simulation, in addition to the use of the digital twin simulation to make the predictions as described above.

At 206, augmented reality devices may be identified in the path. This identification may first identify the position of users nearby the vehicle, determine that a specific user may be in the predicted path and then identify whether those users possess an augmented reality device. At this step, there may be known users, such as workers in a factory space that may be regularly near or at least in the path of a subject vehicle, and also unknown users that may walk around the same factory space and not have been encountered by the process before. In either case, position information about a user may be obtained through an appropriate device, such as GPS information from a smartphone carried by a user or other fixed devices in a closed space that may detect movement within the space, subject to the informed consent that is described above to protect personally identifying information about individual users.

In an embodiment, a supervised machine learning model may be trained to predict the movements of a user based on historical information about the movements of the user within the space and whether those movements may put the known user in the path of a vehicle. One or more of the following machine learning algorithms may be used: logistic regression, naive Bayes, support vector machines, deep neural networks, random forest, decision tree, gradient-boosted tree, multilayer perceptron. In an embodiment, an ensemble machine learning technique may be employed that uses multiple machine learning algorithms together to assure better classification when compared with the classification of a single machine learning algorithm. In this embodiment, training data for the model may include historical information about the user, which may not necessarily be a specific person but rather any human fulfilling a certain function in a closed space, such as a supervisor on a factory floor, which could change by shift and may be performing the same duties regardless of the individual. The training data may be collected from a single user or multiple users. The results may be stored in a database so that the data is most current, and the output would always be up to date. It should be noted that this machine learning model may be used for known users, where the path and behavior may be more easily known as it may be repeated and may be common in a closed space, such as a forklift driver in a warehouse or a baggage handler in the airport scenario that may take specific routes across the tarmac.

As mentioned above, the current position of the user, including the predicted movements of the user, may be compared to the predicted path of 204 and a determination may be made as to whether the user currently or will be in the predicted path of the vehicle. If a user is determined to be in the predicted path of the vehicle, the process may then identify the devices that the user possesses, looking for augmented reality devices such as a headset or glasses or other devices that may display an augmented reality environment to the user. It should be noted that even if a user is not determined to be in the predicted path of the user, alerts or other notifications about the path of a nearby vehicle may still be of interest to the user could be provided by the process in 208.

At 208, the predicted path may be displayed in the augmented reality device. In the event that a user does not have an augmented reality device, alerts or other notifications may be provided to the user through any device that the user may have, e.g., mobile phone, or another method in a closed space such as a monitor or loudspeaker. The display may include a specific predicted path or may also be in the form of the digital twin simulation that was described above, in which case the simulation may be generated in the augmented reality environment when the vehicle comes into the field of view of the user through the device and may also include a time-based view of the simulation, where the user may have a graphical user interface (GUI) of some sort to manipulate the simulation and better understand the predictions being made by the simulation. Such a view of the digital twin may also be customizable such that the user may enter parameters into the simulation to adjust predictions that may be displayed in the augmented reality environment.

One of ordinary skill in the art will recognize that, while the process described herein discusses alerting users based on the movements of objects in the space, there may also be an alternate method of a user with an augmented reality device in a specific space making a request for information about vehicles in the space. In such an embodiment, the data regarding the vehicles and user movements in the space may be sent to the augmented reality device, as opposed to detecting all the users and devices in the space and either displaying the predicted path in augmented reality devices or transmitting alerts or other notifications to the users that may be in the predicted path or proximate to the predicted path. Such information may be targeted to the user making the request, though all the information that has been gathered in the prior steps would be the same.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for predicting and projecting vehicle movements in an augmented reality (AR) environment, the method comprising:

obtaining telemetry data from a vehicle in an environment, wherein the telemetry data is selected from a group consisting of: video data, audio data and text data;

determining a path of the vehicle based on the telemetry data;

determining a path for a user in a space based on position information associated with the user, wherein the user is selected from at least one of a known user that is detected to be regularly near or at least in the path of the vehicle based on historical data of movements associated with the known user, and an unknown user in the space that has not been previously encountered, wherein the position information for the known user and the unknown user is determined using a computing device that detects movement within the space, wherein the determining the path for the known user further comprises predicting a position of the known user based on the historical data of movements of the known user within the space and whether the movements are predicted to place the known user in the path of the vehicle, wherein the historical data of movements is further based on the known user fulfilling a function, and wherein determining the path for the unknown user further comprises detecting the movement for the unknown user within the space based on the position information;

identifying an augmented reality device, wherein the augmented reality device is associated with the user at least predicted to be proximate to the path of the vehicle, wherein in response to the user being the known user, the known user is predicted to be proximate to the path of the vehicle based on the historical data of movements, wherein in response to the user being the unknown user, the unknown user is predicted to be proximate to the path of the vehicle based on the detected movement for the unknown user within the space; and displaying the path of the vehicle in the path of the user using the augmented reality device in the augmented reality (AR) environment.

2. The computer-implemented method of claim 1, further comprising transmitting an alert to the user.

3. The computer-implemented method of claim 1, wherein the determining the path of the vehicle further comprises:

creating a digital twin instance of the vehicle;

generating a simulation of the movements of the vehicle using the digital twin instance; and updating the path of the vehicle based on the simulation of the movements of the vehicle.

4. The computer-implemented method of claim 3, further comprising displaying the simulation of the movements of the vehicle on the augmented reality device.

5. The computer-implemented method of claim 1, wherein the identifying the augmented reality device further comprises:

obtaining user data from the environment, wherein the user data is selected from a second group consisting of: user image data, user audio data and user text data; and determining that the user is proximate to the path of the vehicle, wherein the user is associated with the augmented reality device.

6. The computer-implemented method of claim 1, further comprising:

receiving a request from the user for a vehicle path in the environment; and displaying the path of the vehicle to the user in the augmented reality environment.

7. The computer-implemented method of claim 1, wherein the determining the path of the vehicle uses a machine learning model that predicts a position of a moving vehicle based on movement data and historical information about the moving vehicle.

8. A computer system for predicting and projecting vehicle movements in an augmented reality (AR) environment, the computer system comprising:

one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:

obtaining telemetry data from a vehicle in an environment, wherein the telemetry data is selected from a group consisting of: video data, audio data and text data;

determining a path of the vehicle based on the telemetry data;

determining a path for a user in a space based on position information associated with the user, wherein the user is selected from at least one of a known user that is detected to be regularly near or at least in the path of the vehicle based on historical data of movements associated with the known user, and an unknown user in the space that has not been previously encountered, wherein the position information for the known user and the unknown user is determined using a computing device that detects movement within the space, wherein the determining the path for the known user further comprises predicting a position of the known user based on the historical data of movements of the known user within the space and whether the movements are predicted to place the known user in the path of the vehicle, wherein the historical data of movements is further based on the known user fulfilling a function, and wherein determining the path for the unknown user further comprises detecting the movement for the unknown user within the space based on the position information;

identifying an augmented reality device, wherein the augmented reality device is associated with the user at least predicted to be proximate to the path of the vehicle, wherein in response to the user being the known user, the known user is predicted to be proximate to the path of the vehicle based on the historical data of movements, wherein in response to the user being the unknown user, the unknown user is predicted to be proximate to the path of the vehicle based on the detected movement for the unknown user within the space; and displaying the path of the vehicle in the path of the user using the augmented reality device in the augmented reality (AR) environment.

9. The computer system of claim 8, further comprising transmitting an alert to the user.

10. The computer system of claim 8, wherein the determining the path of the vehicle further comprises:

creating a digital twin instance of the vehicle;

generating a simulation of the movements of the vehicle using the digital twin instance; and updating the path of the vehicle based on the simulation of the movements of the vehicle.

11. The computer system of claim 10, further comprising displaying the simulation of the movements of the vehicle on the augmented reality device.

12. The computer system of claim 8, wherein the identifying the augmented reality device further comprises:

obtaining user data from the environment, wherein the user data is selected from a second group consisting of: user image data, user audio data and user text data; and determining that the user is proximate to the path of the vehicle, wherein the user is associated with the augmented reality device.

13. The computer system of claim 8, further comprising:

receiving a request from the user for a vehicle path in the environment; and displaying the path of the vehicle to the user in the augmented reality environment.

14. The computer system of claim 8, wherein the determining the path of the vehicle uses a machine learning model that predicts a position of a moving vehicle based on movement data and historical information about the moving vehicle.

15. A computer program product for predicting and projecting vehicle movements in an augmented reality (AR) environment, the computer program product comprising:

a computer-readable storage device having program instructions embodied therewith, the program instructions executable by a processor to cause the processor to perform a method comprising:

obtaining telemetry data from a vehicle in an environment, wherein the telemetry data is selected from a group consisting of: video data, audio data and text data;

determining a path of the vehicle based on the telemetry data;

determining a path for a user in a space based on position information associated with the user, wherein the user is selected from at least one of a known user that is detected to be regularly near or at least in the path of the vehicle based on historical data of movements associated with the known user, and an unknown user in the space that has not been previously encountered, wherein the position information for the known user and the unknown user is determined using a computing device that detects movement within the space, wherein the determining the path for the known user further comprises predicting a position of the known user based on the historical data of movements of the known user within the space and whether the movements are predicted to place the known user in the path of the vehicle, wherein the historical data of movements is further based on the known user fulfilling a function, and wherein determining the path for the unknown user further comprises detecting the movement for the unknown user within the space based on the position information;

identifying an augmented reality device, wherein the augmented reality device is associated with the user at least predicted to be proximate to the path of the vehicle, wherein in response to the user being the known user, the known user is predicted to be proximate to the path of the vehicle based on the historical data of movements, wherein in response to the user being the unknown user, the unknown user is predicted to be proximate to the path of the vehicle based on the detected movement for the unknown user within the space; and displaying the path of the vehicle in the path of the user using the augmented reality device in the augmented reality (AR) environment.

16. The computer program product of claim 15, further comprising transmitting an alert to the user.

17. The computer program product of claim 15, wherein the determining the path of the vehicle further comprises:

creating a digital twin instance of the vehicle;

generating a simulation of the movements of the vehicle using the digital twin instance; and updating the path of the vehicle based on the simulation of the movements of the vehicle.

18. The computer program product of claim 17, further comprising displaying the simulation of the movements of the vehicle on the augmented reality device.

19. The computer program product of claim 15, wherein the identifying the augmented reality device further comprises:

obtaining user data from the environment, wherein the user data is selected from a second group consisting of: user image data, user audio data and user text data; and determining that the user is proximate to the path of the vehicle, wherein the user is associated with the augmented reality device.

20. The computer program product of claim 15, further comprising:

receiving a request from the user for a vehicle path in the environment; and displaying the path of the vehicle to the user in the augmented reality environment.

* * * * *